(12) United States Patent
Vann

(10) Patent No.: US 8,487,486 B1
(45) Date of Patent: Jul. 16, 2013

(54) FOLDED ELECTROMAGNETIC COIL

(76) Inventor: Charles Stuart Vann, El Dorado Hills, CA (US)

( * ) Notice: Subject to any disclaimer, the term of this patent is extended or adjusted under 35 U.S.C. 154(b) by 265 days.

(21) Appl. No.: 12/931,117

(22) Filed: Jan. 24, 2011

(51) Int. Cl.
*H02K 41/02* (2006.01)

(52) U.S. Cl.
USPC .................................. 310/12.21; 310/208

(58) Field of Classification Search
USPC .................................. 310/201–208, 12.21
See application file for complete search history.

(56) References Cited

U.S. PATENT DOCUMENTS

| | | | |
|---|---|---|---|
| 4,939,400 A * | 7/1990 | Matsushita et al. | 310/208 |
| 5,204,570 A * | 4/1993 | Gerfast | 310/156.38 |
| 5,793,133 A * | 8/1998 | Shiraki et al. | 310/81 |
| 6,481,092 B2 | 11/2002 | Buttrick, Jr. | |
| 6,629,356 B2 * | 10/2003 | Wang et al. | 29/596 |
| 6,910,258 B2 * | 6/2005 | Wang et al. | 29/598 |
| 7,741,944 B2 * | 6/2010 | Leghissa et al. | 336/225 |
| 2004/0145249 A1 * | 7/2004 | Brown | 310/26 |
| 2011/0304146 A1 * | 12/2011 | Surodin | 290/54 |

OTHER PUBLICATIONS

Paul Dvorak, Novel magnetic-field manipulation leads to unusual generator, Jun. 23, 2009, Windpower Engineering Development, http://www.windpowerengineering.com/news.

* cited by examiner

Primary Examiner — Thanh Lam

(57) ABSTRACT

In accordance with the embodiment a folded electromagnetic coil comprises an electrically conducting wire looped and folded many times such that two or more semicircular sections are formed with approximately the same centerline and the same coil opening such that a supported-magnet can pass unobstructed though the coil center.

18 Claims, 4 Drawing Sheets

FOLDED ELECTROMAGNETIC COIL

CROSS-REFERENCE TO RELATED APPLICATIONS

None

FEDERAL SPONSORED RESEARCH

Not applicable

SEQUENCE LISTING OF PROGRAM

Not applicable

BACKGROUND

1. Field

This application relates to electromagnetic coils used in electric generators, electric motors, and other electrical equipment.

2. Prior Art

Most electric generators and electric motors use electromagnetic coils to either convert mechanical motion into electricity (generator) or convert electricity into mechanical motion (motor). These electromagnetic coils are generally made of electrically conductive and insulated wire either wound into a winding without a metal core (coreless) or wound into a winding around a ferromagnetic material (core) such as iron or steel. These coils consist of a single wire wound in many approximately parallel loops (turns) that are flat and unfolded.

It is well known in the art that an electrical current passing through a wire induces a magnetic field that uniformly circles the wire in a plane perpendicular to the direction of current. However, when many wire loops are formed into a coil (winding), current flow creates a magnetic field from each wire that extends to pass through the coil center, concentrating the magnetic field along the coil centerline. The concentrated magnetic field at the coil center can be many times more than the magnetic field elsewhere around the coil.

However, the coreless electromagnetic coil used in some rotating generators or motors cannot take advantage of the concentrated magnetic field as described above. This is simply due to the circular shape of the coil blocks a radial support of the magnet, or the magnet itself, passing through the coil center, or the converse of the coil passing around a magnet on its centerline. Linear generators and motors are an exception because the magnet can have linear support along the coil centerline without interfering with linear motion of either the magnet or coil.

Therefore, coreless electromagnetic coils loose the benefit of the concentrated magnetic field at the coil center to avoid the rotating part (rotor) of a generator or motor colliding with the fixed part (stator) of the generator or motor. For example, a fixed arrangement of coreless coils (stator) can be positioned to one or both sides of magnets on a rotor such that the rotor's rotation causes the magnet centers to momentarily align with the coil centers but the magnets do not pass through the coil centers.

To keep cost and complexity low, coreless electromagnetic coils are often found in simple wind turbines where the wind forces blades to rotate magnets across fixed electromagnetic coils (as described above), generating electricity. Without ferromagnetic cores, the generator is simpler and less expensive, but the power produced is much lower than generators that have electromagnetic coils with ferromagnetic cores.

Coils with ferromagnetic cores take advantage of the concentrated field at coil center, but at a price of more complexity and expense. The coil wire is wrapped around a ferromagnetic core forming an electromagnet with a north or south-pole at the ends, depending on the direction of the current through the coil. If the current direction is reversed, the magnetic poles reverse.

The literature describes many types of generators and motors using electromagnetic coils with cores. In general, the core of electromagnetic coil is positioned opposite a magnet such that a relative movement induces a magnetic field in the core. That relative movement can be either coils rotating about fixed magnets, or magnets rotating about fixed coils. The magnets can be permanent, electromagnet, or an electrically conducting cage as in an inductive motor. Furthermore, a circular pattern of coils can be fixed or rotate on the inside or outside of a circular pattern of fixed or rotating magnets. Whatever the arrangement, there are advantages and disadvantages of using ferromagnetic cores in the electromagnetic coils of generators and motors.

The primary advantage is that the core enables access to the concentrated magnetic field in the coil center such that a relative motion of the core and magnet generates more current than a coreless coil.

The disadvantages are more complexity and expense than a coreless coil. In addition, to the added cost of the cores, the introduction of ferromagnetic cores cause a problem called torque cogging, or just cogging. The magnet and core inherently attract each other, and considerable force must be expended to separate them or the rotor will not rotate. This is called cogging, and it is a major problem for generators. For example, considerable wind energy is lost to a wind turbine before the wind is strong enough to overcome cogging and self-start the generator. Cogging also causes instability, vibration, noise, and damage to generators. Since cogging is such a problem, considerable design and operational tradeoffs from optimum performance are made to reduce it. These tradeoffs generally reduce power output, increase cost, and add complexity.

Furthermore, induction generators use electromagnetic coils with cores to control the rotation of the rotor such that a force causing rotation to exceed a prescribed speed generates electrical power. Induction generators have an advantage of generating grid ready power, even when the external force varies. However, to produce useful power, this range of variation can be narrow, forfeiting energy outside the range. Another disadvantage is that the electronics is more complex, and some of the generated power is consumed by the generator itself, in order to keep the coils charged.

Therefore, prior art generators and motors have significant disadvantages.

SUMMARY

In accordance with the embodiment a folded electromagnetic coil comprises an electrically conducting wire looped and folded many times such that two or more semicircular sections are formed with approximately the same centerline and same coil opening such that a supported-magnet can pass unobstructed though the coil center.

DRAWING

FIGS. 1-10

In the drawings, closely related figures have the same number but different alphabetical suffixes.

FIGS. 7A-E shows side views of the folded electromagnetic coil as one magnet, north-pole leading, momentarily passes different locations along the coil centerline.

Figure 8:
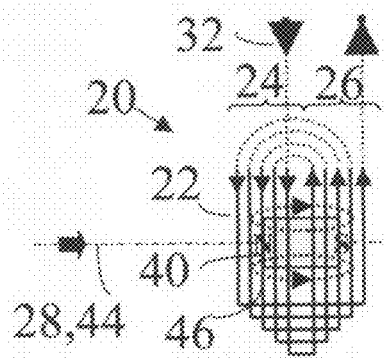

FIG. 8 shows a side view of the folded electromagnetic coil as one magnet, south-pole leading, momentarily passes in between the first and second semicircle coil sections.

Figures 9A, 9B:
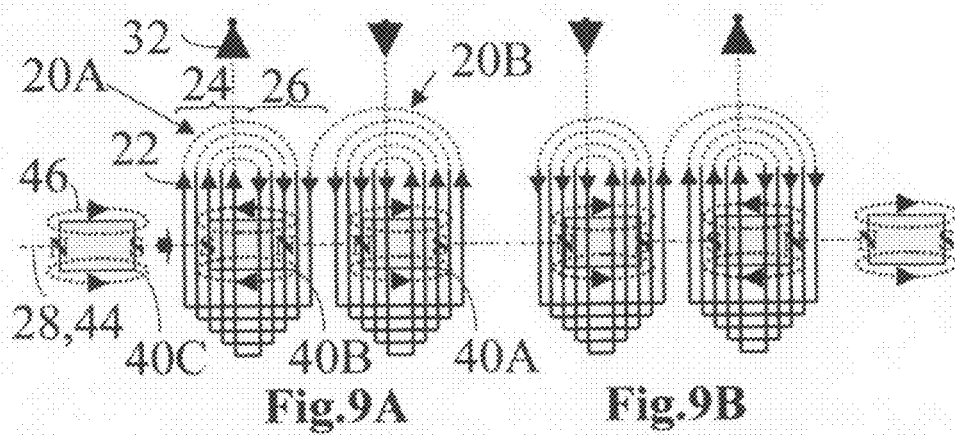

FIGS. 9A-B shows side views of the folded electromagnetic coil as three magnets, alternate-poles leading, momentarily pass different locations along coil centerline.

Figures 10A, 10B:
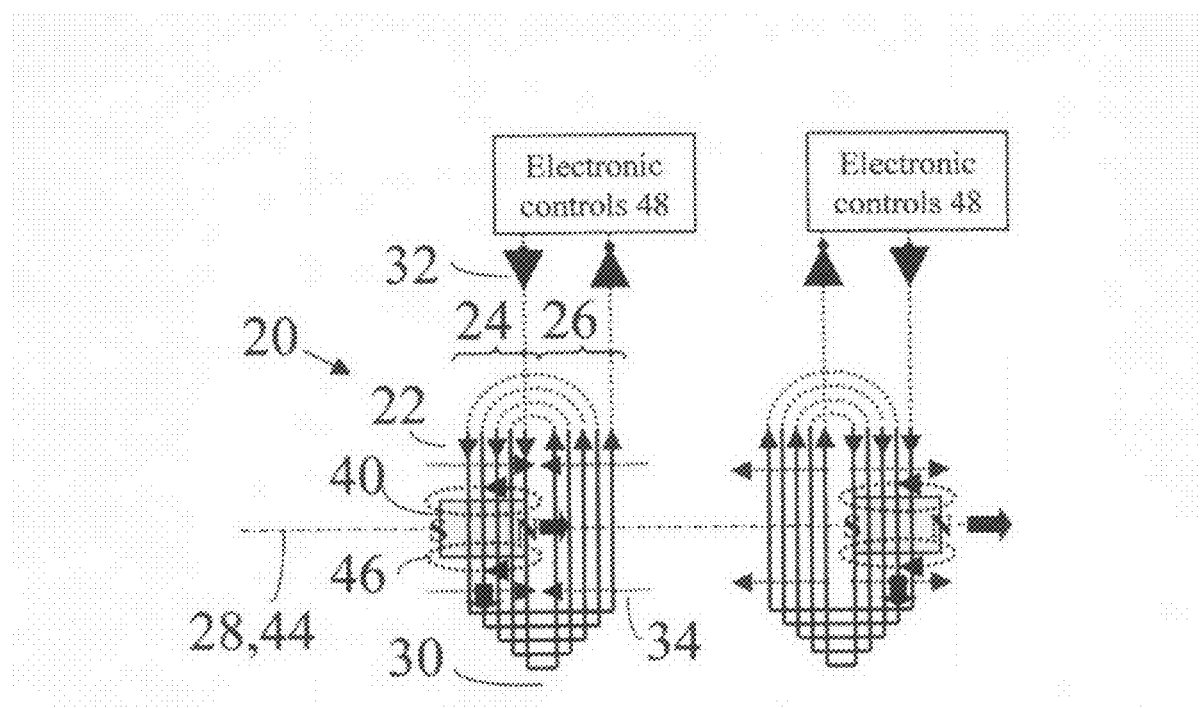

FIGS. 10A-B shows side views of the folded electromagnetic coil as one magnet, north-pole leading, is forced by alternating current to move along the coil centerline.

REFERENCE NUMERALS

20 folded electromagnetic coil
22 wire
24 first semicircle section of coil
26 second semicircle section of coil
28 coil centerline
30 coil opening
32 electric current
34 coil magnetic-field
40 magnet
42 magnet support
44 magnet centerline
46 magnet magnetic-field
48 electronic controls

DETAILED DESCRIPTION

FIGS. 1-3

Figure 1:
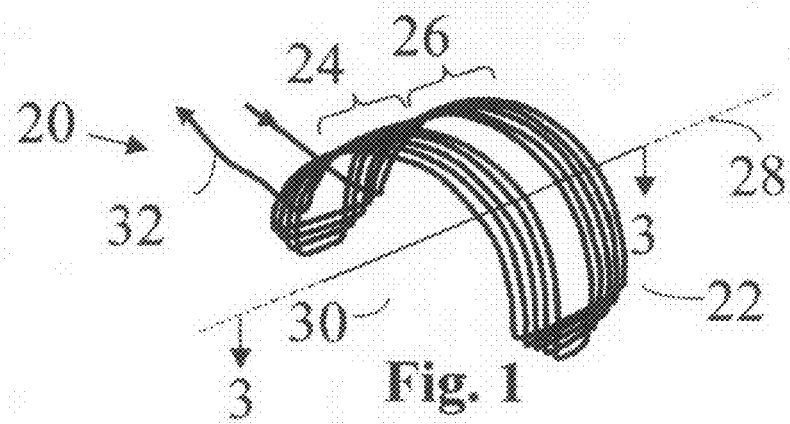
FIG. 1 shows an isometric view of the folded electromagnetic coil.
Figure 2:
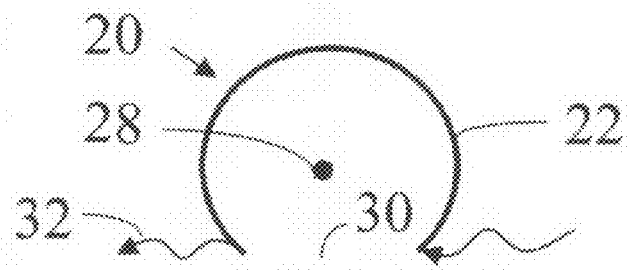
FIG. 2 shows an end view of the folded electromagnetic coil as viewed along the coil centerline.

The embodiment of the folded electromagnetic coil 20 is illustrated in a FIG. 1 (isometric) and FIG. 2 (end view) and consists of wire 22. Wire 22 is electrically conductive and may be covered with electrical insulation material. Coil 20 is made from wire 22 wrapped into many loops that are folded to form a first semicircle section 24 and a second semicircle section 26 that have approximately the same coil centerline 28 and approximately the same coil opening 30 with respect to coil 20 not completely encircling coil centerline 28. Centerline 28 can be linear, curved, or other shapes. Coil opening 30 can be any circular subsection.

Figure 3:
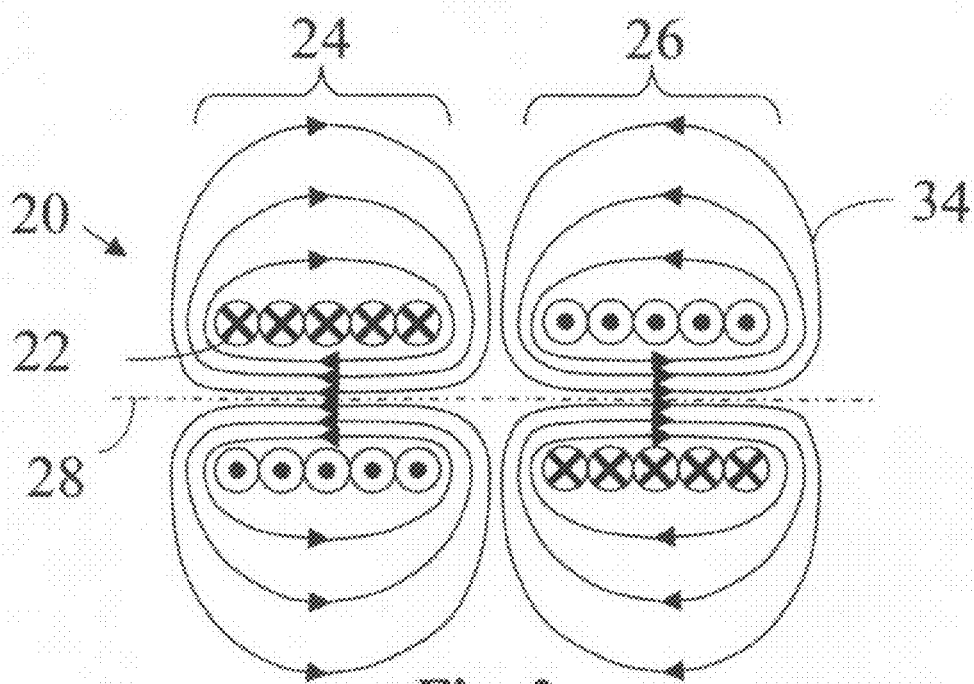
FIG. 3 shows a cross section view of the magnetic field from the folded electromagnetic coil as viewed from a horizontal plane cutting through the centerline and wires of the two semicircle sections. The crosses are wires in which current is moving into the page; the dots are wires in which current is moving out of the page.

When a changing electric current 32 passed through coil 20, it induces a magnetic-field 34 that concentrates at the center of coil 20 as shown in FIG. 3.

Figure 4:
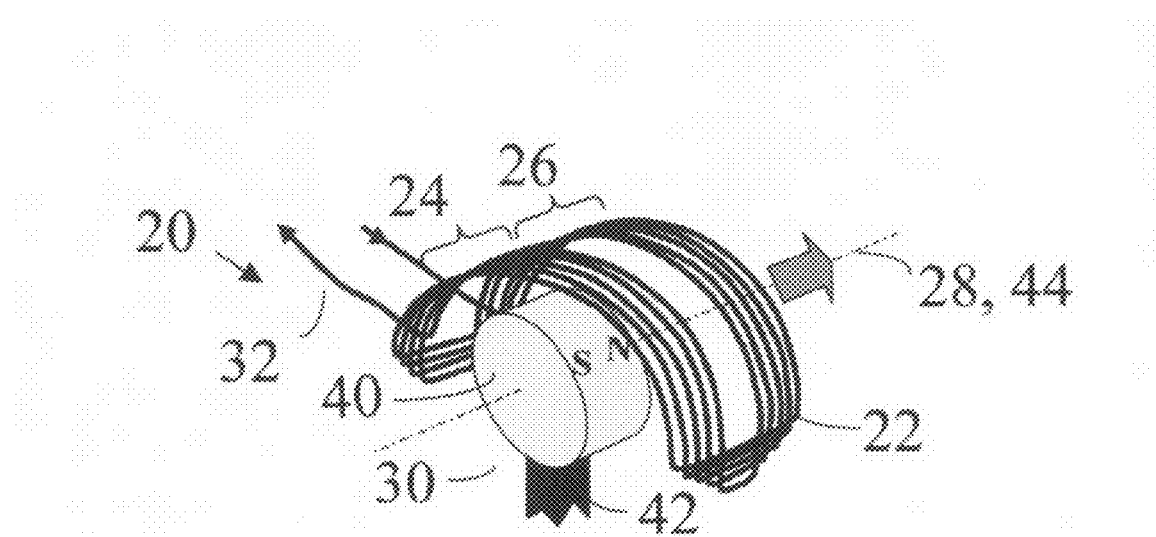
FIG. 4 shows an isometric view of the folded electromagnetic coil embodiment with a magnet and support passing along the coil centerline.
Figure 5:
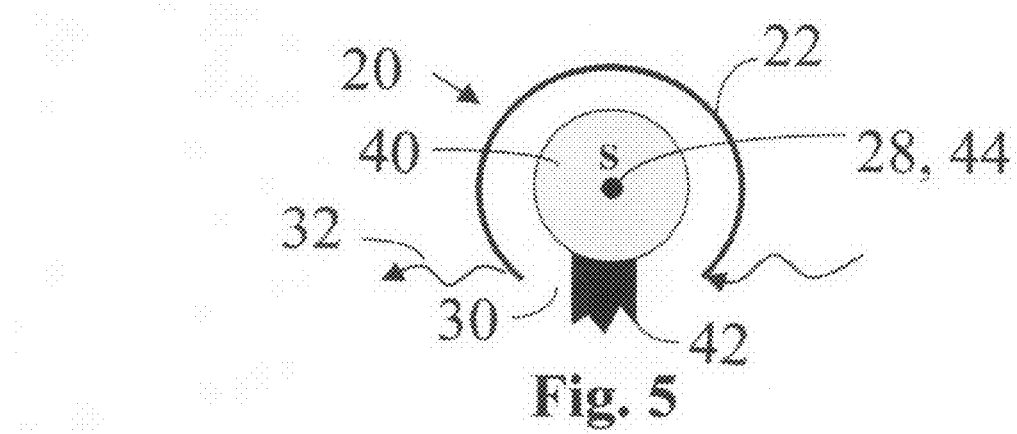
FIG. 5 shows an end view of the folded electromagnetic coil with a magnet passing along the coil centerline.
Figure 6:
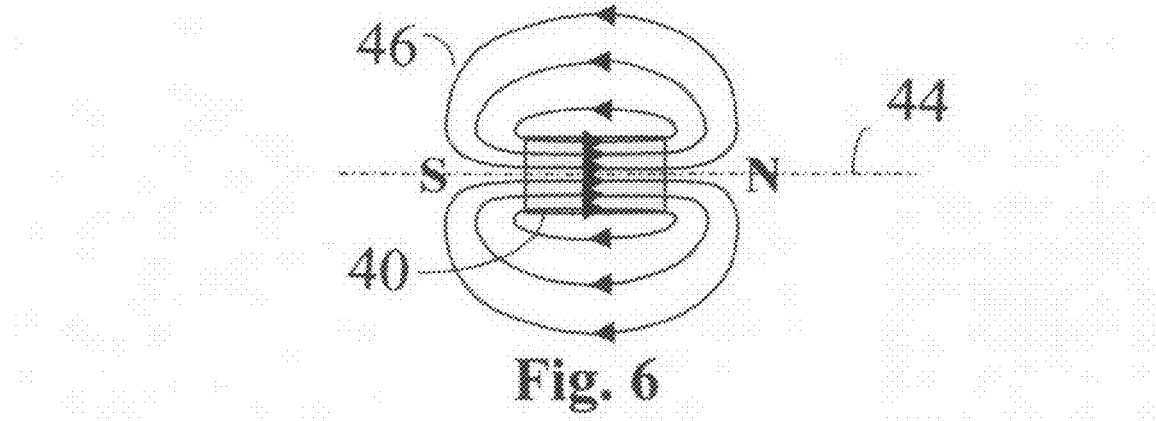
FIG. 6 shows a cross section view of the magnetic field emanating from a magnet.

Operation—FIGS. 4-6

Because coil 20 does not completely surround centerline 28, magnet 40 with support 42 can pass along centerline 28 unobstructed (or coil 20 can pass around magnet 40) as shown in FIG. 4 (isometric) and FIG. 5 (end view). Magnet 40 can be permanent or electromagnetic with a north and south-pole, a magnet centerline 44, and magnetic-field 46 surrounding it as shown in FIG. 6. Magnet 40 can pass along coil centerline 28 with its north-pole leading through coil 20, or its south-pole leading through coil 20, or both north/south leading through coil 20 at the same time, or any other orientation of poles relative motion of magnet 40 and coil 20 along centerline 28.

Support 42 can be any shape or material to support a plurality of magnets 40 in linear or rotational motion through a plurality of coils 20. A portion, all, or none of support 42 may pass through coil 20 depending on the size and shape of magnet 40. For example, magnet 40 may be sized and shaped to pass through coil 20 without support 42.

Example of Operation in an electric generator—FIGS. 7-9

To generate electricity with the folded electromagnetic coil 20, an external force such as a wind turbine moves magnet 40 through coil 20 along coil centerline 28 (or moves coil 20 around magnet 40 on coil centerline 28). As described below, current 32 is generated in alternating directions as magnet 40 passes through centerline 28.

Figures 7A, 7B, 7C, 7D, 7E:
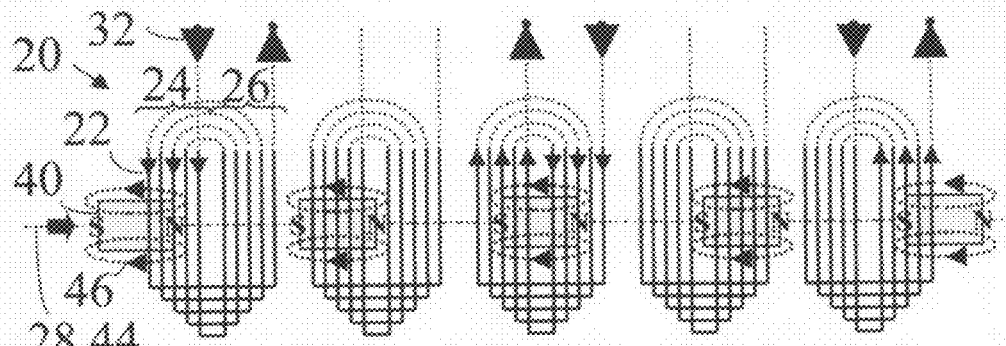

When magnet 40, with north-pole leading, momentarily passes half way into first semicircle section 24, its magnetic field 46 induces current 32 that flows counterclockwise as shown in FIG. 7A.

When magnet 40 momentarily passes to the center of first semicircle section 24, its magnetic field 46 induces current 32 in first semicircle section 24 but equally in opposite directions such that current 32 sums to zero as shown in FIG. 7B.

When magnet 40 momentarily passes in between first and second semicircle section 24, 26, its magnetic field 46 induces current 32 that flows clockwise through both sections 24,26 such that current 32 from section 24,26 are in the same direction and add as shown in FIG. 7C.

When magnet 40 momentarily passes to the center of second semicircle section 26, its magnetic field 46 induces current 32 in second semicircle section 24 but equally in both directions, producing a sum of zero current as shown in FIG. 7D.

When magnet 40 momentarily passes half way into second semicircle section 26, its magnetic field 46 induces current 32 that flows counterclockwise as shown in FIG. 7E.

When magnet 40, with south-pole leading, passes in between first and second semicircle section 24, 26, its magnetic field 46 induces current 32 that flows counterclockwise through both sections 24,26 such that current 32 adds as shown in FIG. 8. It should be noted that current 32 is in the opposite direction of the same magnet location of FIG. 7C with north-pole leading.

Thus, when a first magnet 40A, south pole leading, momentarily passes into the center of a second coil 20B and a second magnet 40B, north-pole leading, momentarily pass into the center of a first coil 20A, their magnetic fields 46 are in opposite direction yet both generate current 32 in a clockwise direction such that current 32 from both coils 20A, 20B as connected are in the same direction and add as shown in FIG. 9A.

When a second magnet 40B, north pole leading, momentarily passes into the center of second coil 20B and a third magnet 40C, south-pole leading, momentarily pass into the center of first coil 20A, their magnetic fields 46 are again in opposite directions and in this situation both generate current 32 in a counterclockwise direction such that current 32 from coils are in the same direction and add as shown in FIG. 9B.

Thus, a plurality of magnets 40, with alternating poles leading, passing through a plurality of coils 20 can generate alternating current 32 in the same direction such that current 32 increases linearly with an increase in magnets 40 and coils 20. Current 32 can also be increased by moving magnets 40 faster through coils 20 and increasing the number of loops in coil 20.

Example of Operation in an Electric Motor—FIG. 10

The folded electromagnetic coil 20 can also produce mechanical force of a motor when current 32 is introduced into coil 20 from an external source such as a battery or an electric power plant. Current 32 induces coil magnetic-field 34 as shown in FIG. 3. With precise timing, electronic controls 48 reverse the direction of current 32 causing a reverse in the direction of coil magnetic field 34 such that magnet 40 can be alternately pulled and pushed to move continuously along coil centerline 28.

When an external current 32 is sent counterclockwise through coil 20, coil magnetic-field 34 and magnet magnetic-field 46 are in opposite directions, pushing magnet 40, with north-pole leading, along centerline 28 from first semicircle section 24 to second semicircle section 26 as shown in FIG. 10A. Furthermore, non-symmetric coil magnetic-field 34 around magnet 40, due to coil opening 30, causes a pushing force on magnet 40 in a direction through the middle of coil opening 30 and perpendicular to coil centerline 28. If oriented against gravity, this force could be used to magnetically levitate coil 20 relative to magnet 40 or vice versa.

When an external current 32 is subsequently sent clockwise through coil 20, coil magnetic-field 34 and magnet magnetic-field 46 again are in opposite directions, pushing magnet 40, with north-pole leading, along centerline 28 from second semicircle section 24 to outside coil 20 as shown in FIG. 10B. Again, non-symmetric coil magnetic-field 34 around magnet 40 causes a pushing force on magnet 40 in a direction through the middle of coil opening 30 and perpendicular to coil centerline 28.

Advantages

From the description above, a number of advantages of my folded electromagnetic coil become evident:

(a) Produces the same amount of power (current times voltage) as a coil with a ferromagnetic core but avoids the added complexity and costs of a core. A similar size, coreless electromagnet coil produces much less power.

(b) Enables total avoidance of clogging, since there is no ferromagnetic core for the magnets to attract. Consequently, generators and motors with folded electromagnetic coils do not lose power to reduce cogging as is necessary in generators and motors using coils with ferromagnetic cores. Also, the instability, noise, and damage associated with cogging are avoided.

(c) Enables the generator to work at all ranges of external force, avoiding lost power when the generator is not rotated within a certain range as with induction generators.

(d) Enables the electronics for a more productive generator to be very simple and inexpensive. This is particularly beneficial for wind, hydro, and wave turbines.

(e) Enables a motor to be less complicated and less expensive than existing motors, yet operate more efficiently and powerfully with full control of rotation velocity and torque.

(f) With simpler and less expensive generators and motors coupled with more power output, clean power from wind, hydro, and wave become more cost-efficient.

(g) The motor force perpendicular to the centerline could be used to magnetically levitate the rotor, further increasing efficiency by avoiding friction and lowering costs by eliminating bearings and other anti-friction components and maintenance.

CONCLUSIONS, RAMIFICATIONS, AND SCOPE

Accordingly, the reader will see that the folded electromagnetic coil can be used to generate electricity more efficiently than other electromagnetic coils, yet more simply and at lower cost. Cost-effective power generation is a critical parameter for clean power sources such as wind, hydro, and wave power to gain acceptance over conventional coal and oil power plants that pollute our environment.

Likewise, simpler and less expensive motors enable their greater use, improving quality of life and higher productivity all over the world. These high-efficiency, coreless coils may also enable frictionless motors, adding to even better performance.

Although the description above contains many specificities, these should not be construed as limiting the scope of the embodiment but as merely providing illustrations of some of the presently preferred embodiment. For example, larger or smaller magnets can be used to have more or fewer magnets and magnetic poles in a semicircle section.

Thus, the scope of the embodiment should be determined by the appended claims and their legal equivalents, rather than by examples given.

I claim:

1. An electromagnetic-coil, comprising an electrically-conductive wire having been looped and folded many times such that two or more semicircular sections are formed with approximately the same centerline and approximately the same opening with respect to said coil not completely encircling said centerline, whereby an object can pass along said centerline and through said opening.

2. Coil of claim 1 wherein said wire is electrically insulated.

3. Coil of claim 1 wherein said object is a permanent magnet.

4. Coil of claim 1 wherein said object is said permanent magnet with a support.

5. Coil of claim 1 wherein said object is an electromagnet.

6. Coil of claim 1 wherein said object is said electromagnet with said support.

7. A method of generating electricity comprising:
   a. providing a folded electromagnetic coil comprising an electrically-conductive wire having been looped and folded many times such that two or more semicircular sections are formed with approximately the same centerline and the same opening with respect to said coil not completely encircling said centerline,
   b. providing an object that can pass along said centerline and through said opening,
   whereby a current is induced in said coil.

8. Wire of claim 7 wherein said wire is electrically insulated.

9. Coil of claim 7 wherein said object is a permanent magnet.

10. Coil of claim 7 wherein said object is said permanent magnet with a support.

11. Coil of claim 7 wherein said object is an electromagnet.

12. Coil of claim 7 wherein said object is said electromagnet with said support.

13. A method of producing mechanical motion comprising:
- a. providing a folded electromagnetic coil comprising an electrically-conductive wire having been looped and folded many times such that two or more semicircular sections are formed with approximately the same centerline and the same opening with respect to said coil not completely encircling said centerline,
- b. providing an object that can pass along said centerline and through said opening,
- c. providing a current in said wire, to induce a mechanical force on said object, whereby said object is forced along said centerline and through said opening.

14. Wire of claim 13 wherein said wire is electrically insulated.

15. Coil of claim 13 wherein said object is a permanent magnet.

16. Coil of claim 13 wherein said object is said permanent magnet with a support.

17. Coil of claim 13 wherein said object is an electromagnet.

18. Coil of claim 13 wherein said object is said electromagnet with said support.

* * * * *